United States Patent
Onitsuka

(10) Patent No.: US 11,800,022 B2
(45) Date of Patent: Oct. 24, 2023

(54) INFORMATION PROCESSING APPARATUS, INFORMATION PROCESSING METHOD, AND NON-TRANSITORY COMPUTER READABLE MEDIUM FOR COMMUNICATING DATA USING A FIRST NETWORK INTERFACE AND A SECOND NETWORK INTERFACE

(71) Applicant: FUJIFILM Business Innovation Corp., Tokyo (JP)

(72) Inventor: Miki Onitsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/557,709

(22) Filed: Dec. 21, 2021

(65) Prior Publication Data
US 2023/0020757 A1 Jan. 19, 2023

(30) Foreign Application Priority Data
Jul. 16, 2021 (JP) .................................. 2021-118098

(51) Int. Cl.
*H04N 1/00* (2006.01)

(52) U.S. Cl.
CPC ................................ *H04N 1/0022* (2013.01)

(58) Field of Classification Search
None
See application file for complete search history.

(56) References Cited

U.S. PATENT DOCUMENTS

| 9,501,252 | B2 | 11/2016 | Komatsubara et al. |
| 2016/0117137 | A1* | 4/2016 | Komatsubara ........ G06F 3/1286 358/1.14 |
| 2019/0281188 | A1 | 9/2019 | Tanaka |

FOREIGN PATENT DOCUMENTS

| JP | 2016-86267 A | 5/2016 |
| JP | 2019-161403 A | 9/2019 |

* cited by examiner

*Primary Examiner* — Lennin R Rodriguezgonzalez
(74) *Attorney, Agent, or Firm* — Sughrue Mion, PLLC

(57) ABSTRACT

An information processing apparatus includes a processor configured to, in a case where data is stored into a first storage area set in advance to store data and associated with a first network interface and a condition specified in advance is satisfied, copy the data from the first storage area into a second storage area set in advance to store data and associated with a second network interface, and output the data in a predetermined transmission mode.

13 Claims, 9 Drawing Sheets

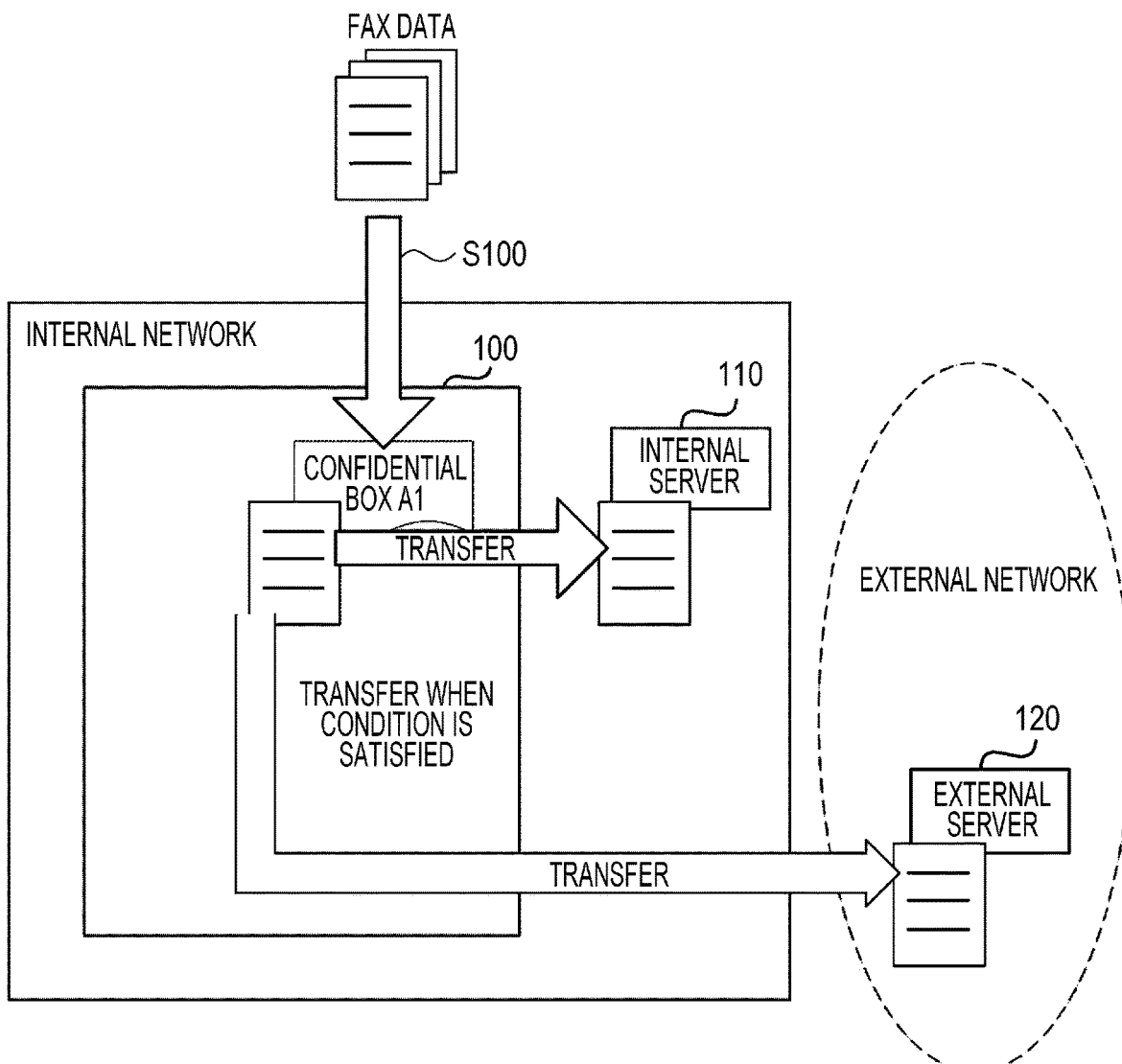

INFORMATION PROCESSING APPARATUS, INFORMATION PROCESSING METHOD, AND NON-TRANSITORY COMPUTER READABLE MEDIUM FOR COMMUNICATING DATA USING A FIRST NETWORK INTERFACE AND A SECOND NETWORK INTERFACE

CROSS-REFERENCE TO RELATED APPLICATIONS

This application is based on and claims priority under 35 USC 119 from Japanese Patent Application No. 2021-118098 filed Jul. 16, 2021.

BACKGROUND (i) Technical Field

The present disclosure relates to an information processing apparatus, an information processing method, and a non-transitory computer readable medium.

(ii) Related Art

An information processing apparatus is disclosed in Japanese Unexamined Patent Application Publication No. 2019-161403. The information processing apparatus includes a storage area that stores data, and memory means for storing definition information in association with the storage area, the definition information defining a network interface permitted as an output path of the data stored in the storage area.

An image processing apparatus is disclosed in Japanese Unexamined Patent Application Publication No. 2016-086267. The image processing apparatus includes image data acquiring means for acquiring image data and transmitting means. In the case where a first transmission destination specified by a user as a destination to which the image data is to be transmitted is not safe, the transmitting means transmits the image data to a second transmission destination that is different from the first transmission destination and transmits information indicating the second transmission destination to the first transmission destination.

SUMMARY

In operation of facsimile (hereinafter, referred to as FAX) communications, FAX data such as a received document is stored into a storage area, which is a so-called a confidential box, and the FAX data is transferred in accordance with a process of a job associated with the storage area. In such a transfer operation, in a multi-interface function of a multi-function machine, setting of a network interface is performed, taking into consideration the security, such that the FAX data is transferred only to an internal network inside the company.

In accordance with the recent increase of teleworking, there may have been demands to check received FAX data outside the office on occasion. However, frequently changing the configuration of a storage area is not desirable in terms of the security, and wrong transmission outside the office may occur.

Aspects of non-limiting embodiments of the present disclosure relate to providing an information processing apparatus, an information processing method, and a non-transitory computer readable medium that are capable of, without changing the configuration of a network associated with a storage area, transferring data to a different network.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, in a case where data is stored into a first storage area set in advance to store data and associated with a first network interface and a condition specified in advance is satisfied, copy the data from the first storage area into a second storage area set in advance to store data and associated with a second network interface, and output the data in a predetermined transmission mode.

BRIEF DESCRIPTION OF THE DRAWINGS

Exemplary embodiments of the present disclosure will be described in detail based on the following figures, wherein:

FIG. 9 is a diagram schematically illustrating a procedure for the case where a process for transferring data directly from a confidential box is performed.

DETAILED DESCRIPTION

Figure 1:
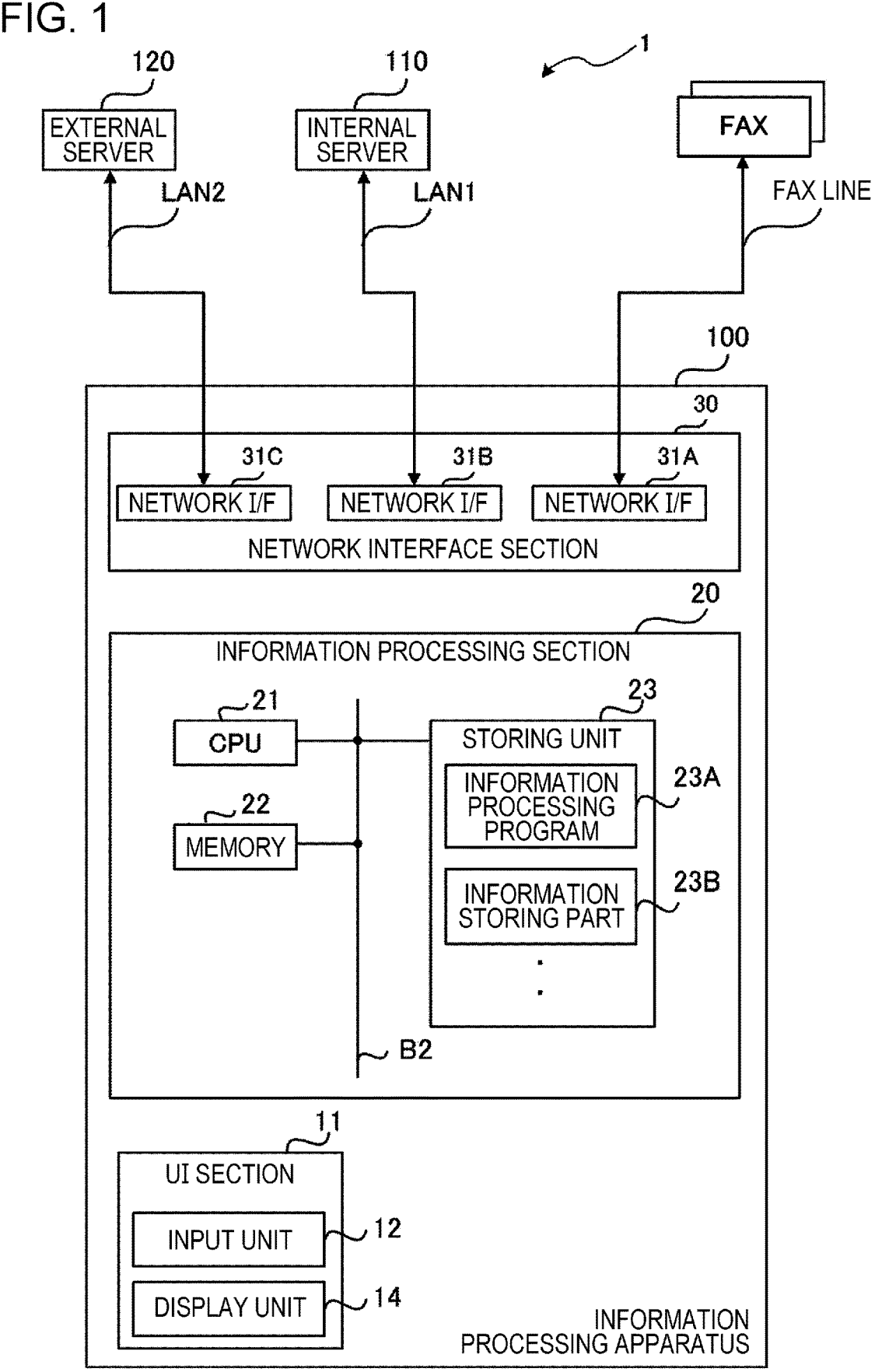
FIG. 1 is a diagram illustrating a configuration of an information processing system according to a first exemplary embodiment of the present disclosure.

Hereinafter, embodiments of the present disclosure will be described with reference to the drawings. Throughout the drawings, the same or equivalent components and parts are denoted by the same reference signs. The dimensional ratios in the drawings are exaggerated for convenience of explanation and may be different from the actual ratios.

First, the concept on which an exemplary embodiment is based will be explained. Paperless operation for converting a FAX document into electronic FAX data and transferring the FAX data to a server or the like has been widely available. In such paperless operation, a job flow function of a digital multifunction machine having a facsimile function and a print function enables FAX data to be transferred by an internal server or email, so that the FAX data may be browsed on a personal computer (PC). The job flow function is associated with a confidential box. The confidential box is a storage area for storing various data such as received FAX data. The job flow function is a function that executes all the consecutively executable jobs together. For example, in the case of a job flow for transferring FAX data to an internal server, a series of jobs including a job for selecting FAX data to be transferred, a job for setting a transfer destination server, and a job for executing transfer are automatically executed.

While there has been a widespread implementation of teleworking, for example, a work style such as working in the office half the week and the other half from home has been increasing. For working from home, there may be a demand to transfer FAX data to an external environment outside the company. However, in typical paperless operation, it is assumed that FAX data is to be accessed from inside the company. Furthermore, transferring FAX data to an external network may cause a concern of security.

Digital multifunction machines have a multi-interface function. With the use of the multi-interface function, multiple internet lines are connected, and switching between networks that are able to perform communications may be performed according to purposes. Typically, in terms of the security, a confidential box is associated with a network interface of multiple interfaces, and a communication path is permitted for the confidential box. For example, network interfaces are divided into network interfaces for internal communication inside the company and network interfaces for external communication outside the company. Under such division of network interfaces, in terms of the security, setting is made such that a communication path permitted for a confidential box in which FAX data is stored is to be used only for an internal network. However, under the telework environment, there may be a demand to transfer FAX data also to an external server on an external network on occasion. In such a case, setting of a network interface for a confidential box needs to be changed. Thus, efforts are required in operation and a concern of security arises. Regarding efforts in operation, for example, the advantage of having a function of automatic transfer to a confidential box is ruined by having to manually set a network interface. Furthermore, a complicated operation such as having to change settings at each time might be needed. Regarding a concern of security, for example, if setting of a network interface for a confidential box is changed such that transfer to an external server is enabled, FAX data that does not need to be transferred to the external server may be transferred to the external server.

Thus, in this exemplary embodiment, when a specific condition specified in advance is satisfied, FAX data is copied into a confidential box for which a different network interface is set and then transferred to an external server. Thus, a function for transferring FAX data to a desired location while maintaining the security without changing the configuration of a network interface at each time may be provided. Furthermore, introduction of a new system is not required, thus introduction cost being reduced. The same applies to scan data read by scanning a document.

First Exemplary Embodiment

A configuration of an information processing system 1 according to a first exemplary embodiment of the present disclosure will be described with reference to FIG. 1. As illustrated in FIG. 1, the information processing system 1 includes an information processing apparatus 100, an internal server 110, and an external server 120. The internal server 110 is, for example, a server to which only an internal network inside a company has an access right. The external server 120 is, for example, a server that is able to be connected through a virtual private network (VPN) or the like used for teleworking.

For convenience of explanation in an exemplary embodiment, networks are divided into internal networks and external networks. Internal network communication does not necessarily represent communication in the entire company. Communication with a part of internal servers may be permitted or communication with a server of an affiliated company or the like may be permitted. For external network communication, all the internet connections are not permitted. Communication with only specific external servers may be permitted. In this exemplary embodiment, the information processing apparatus 100 receives FAX data through a FAX line. Communication between the information processing apparatus 100 and the internal server 110 is performed through a LAN 1 for internal communication. Communication between the information processing apparatus 100 and the external server 120 is performed through a LAN 2 for external transfer.

In this exemplary embodiment, a digital multifunction machine having a facsimile function, an image printing function, an image reading function, an image transmission function, and the like is used as the information processing apparatus 100. Transfer of FAX data, which is a purpose of this exemplary embodiment, is included in the facsimile function. The facsimile function includes a function for storing a received FAX document as FAX data into a confidential box and transferring the FAX data to the internal server 110 in accordance with a job flow.

As illustrated in FIG. 1, the information processing apparatus 100 includes a user interface (UI) section 11, an information processing section 20, and a network interface section 30. The UI section 11 and the information processing section 20 may be configured separately from the information processing apparatus 100. Furthermore, the information processing apparatus 100 according to this exemplary embodiment includes, as principal components, an image forming section, a paper feed section that supplies recording paper, and the like. However, because these sections are not principal components of the present disclosure, description of these sections will be omitted.

Next, a hardware configuration of the UI section 11 according to this exemplary embodiment will be described. The UI section 11 in this exemplary embodiment includes an input unit 12 and a display unit 14.

The input unit 12 includes a pointing device such as a mouse and a keyboard and is used for receiving various types of input information.

The display unit 14 is, for example, a liquid crystal display and displays various types of information. The display unit 14 is of a touch panel type and may function as the input unit 12. Display of various types of information includes display of a confidential box.

Next, a hardware configuration of the information processing section 20 in this exemplary embodiment will be described. In this exemplary embodiment, an information processing device such as a computer or a server may be used as the information processing section 20. The information processing section 20 in this exemplary embodiment includes a CPU 21, a memory 22 as a temporary memory area, and a nonvolatile storing unit 23. The CPU 21, the memory 22, and the storing unit 23 are connected to one another by a bus B2.

The storing unit 23 is implemented by a storing device such as a hard disk drive (HDD), a solid state drive (SSD), or a flash memory. An information processing program 23A is stored in the storing unit 23 as a storage medium. The CPU 21 reads the information processing program 23A from the storing unit 23, loads the read information processing program 23A onto the memory 22, and sequentially executes processes of the information processing program 23A. Furthermore, various types of information that need to be stored, such as an information storing part 23B, is stored in the storing unit 23. For example, a network setting 30A and a condition setting 40A are stored in the information storing part 23B.

The network interface section 30 includes network interfaces (I/Fs) 31A, 31B, and 31C. For convenience of explanation, the case where three network I/Fs are provided will be described. However, the number of network I/Fs may be set appropriately according to needs.

Figure 2:
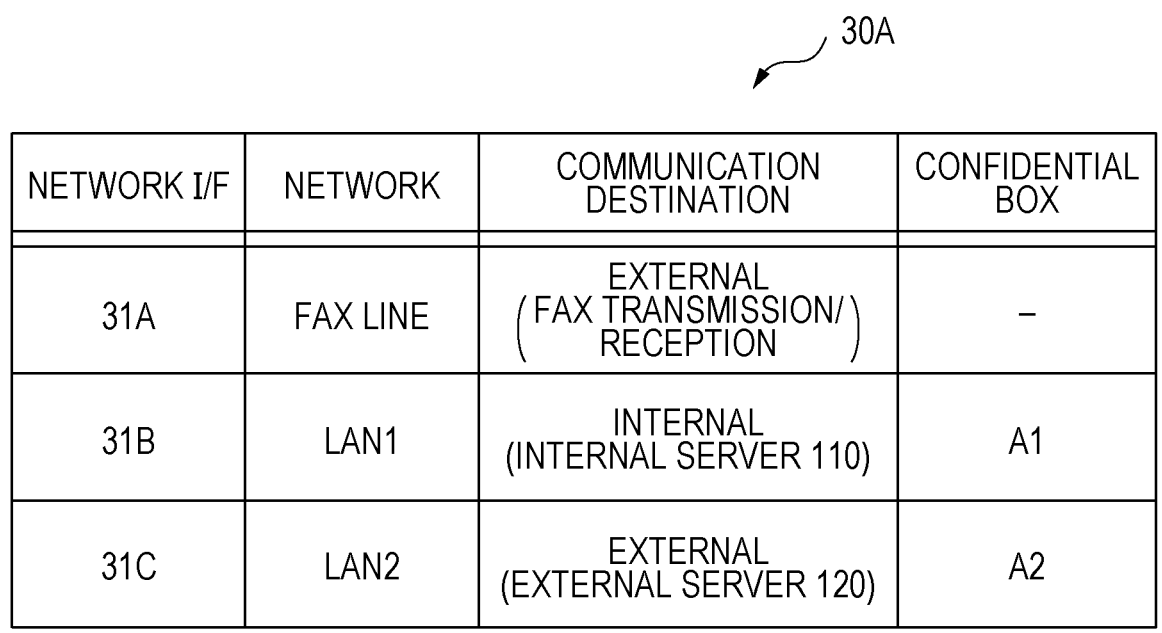
FIG. 2 is a diagram illustrating the list of network settings of a network interface section.

FIG. 2 is a diagram illustrating the list of network settings in the network interface section 30. In the network setting 30A, for each of the network I/F 31A, the network I/F 31B, and the network I/F 31C, a type used for the network, such as a FAX line or a LAN type, and a recipient with which communication is able to be performed, such as an internal recipient or an external recipient, are defined. Furthermore, the network setting 30A indicates correspondence between a confidential box and a network I/F and defines which network I/F each confidential box is able to be communicated with. A FAX line is set as a network for the network I/F 31A. For the network I/F 31A, transmission and reception of FAX data to and from outside the company is able to be performed through a FAX line network. The LAN 1 is set as a network for the network I/F 31B. For the network I/F 31B, transfer of FAX data to the internal server 110 within the company is able to be performed through the LAN 1 network. The LAN 2 is set as a network for the network I/F 31C. For the network I/F 31C, transfer of FAX data to the external server 120 such as an external cloud server outside the company is able to be performed through the LAN 2 network. A confidential box A1 is associated with the network I/F 31B. A confidential box A2 is associated with the network I/F 31B. A confidential box is a storage area set in advance to store data and may be operated using the UI section 11. Although the case where correspondence between a confidential box and a network is set in the network I/F 31A has been described above, correspondence between a confidential box and a network may be set using a table that is independent of the network setting 30A as long as the correspondence is set appropriately. The confidential box A1 is an example of a first storage area in the present disclosure, and the confidential box A2 is an example of a second storage area in the present disclosure.

In an example of this exemplary embodiment, setting is made such that the confidential box A1 is able to be communicated only through the internal server 110 and the confidential box A2 is able to be communicated only through the external server 120. Furthermore, although the case where FAX data is stored in the confidential box A1 will be described as an example, FAX data may be stored in a plurality of confidential boxes. In this case, setting similar to that for the confidential box A1 may be performed for each of the confidential boxes.

As the facsimile function of the information processing apparatus 100, a default setting is made such that received FAX data is stored into the confidential box A1. Furthermore, a job flow for transferring stored FAX data to the internal server 110 is set in the confidential box A1, and a job flow for transferring stored FAX data to the external server 120 is set in the confidential box A2. Transferring FAX data to the external server 120 is an example of a predetermined transmission mode in the present disclosure. The predetermined transmission mode also includes email transmission of FAX data. For email transmission, an email address for which transmission is permitted is associated with a confidential box.

Figure 3:
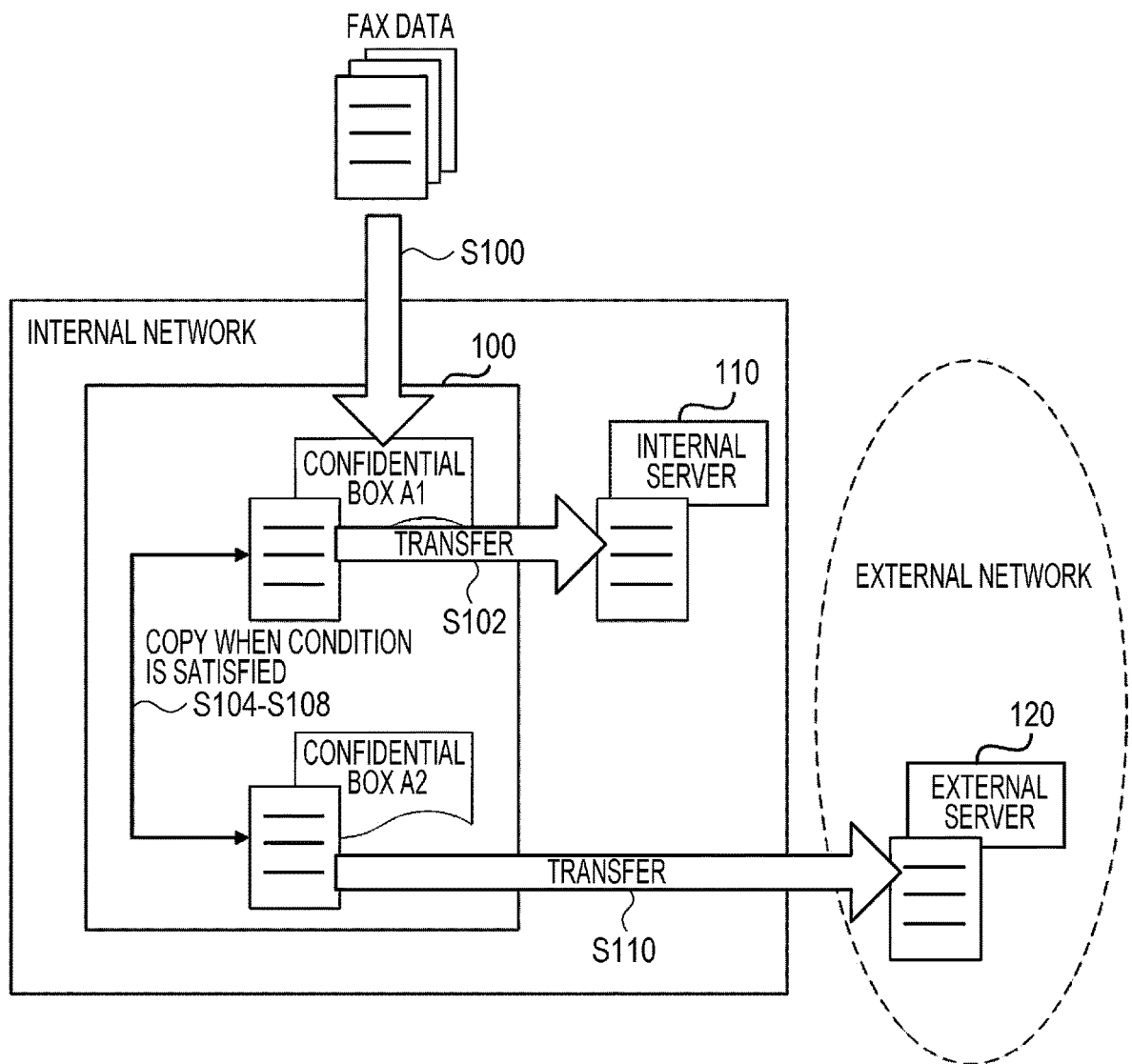
FIG. 3 is a diagram schematically illustrating the procedure of a data transfer process performed by an information processing apparatus.
Figure 4:
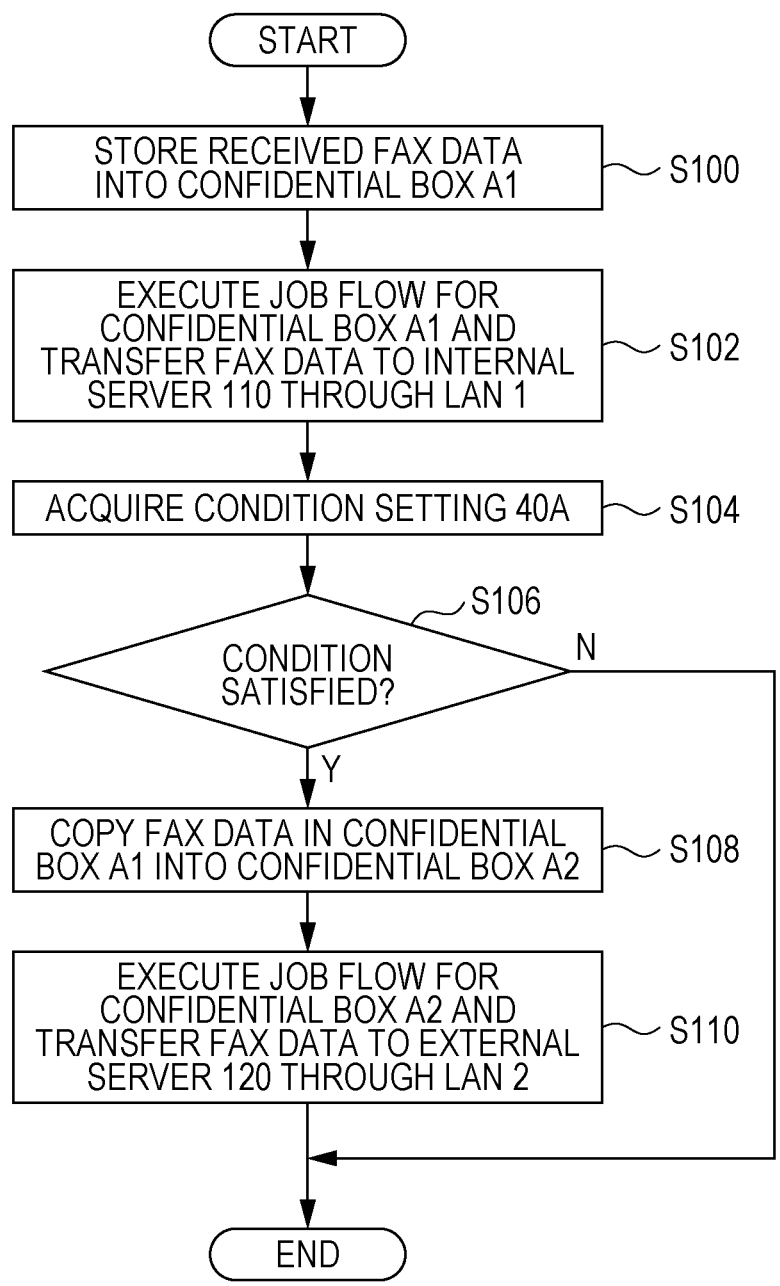
FIG. 4 is a flowchart illustrating a data transfer process performed by an information processing apparatus according to the first exemplary embodiment.

The procedure of a data transfer process according to the first exemplary embodiment will be described. FIG. 3 is a diagram schematically illustrating the procedure of a data transfer process performed by the information processing apparatus 100. FIG. 4 is a flowchart illustrating the data transfer process performed by the information processing apparatus 100 according to the first exemplary embodiment.

In step S100, the CPU 21 receives FAX data through a FAX line and stores the received FAX data into the confidential box A1. The CPU 21 only needs to perform processing necessary for conversion into electronic FAX data before storing of the FAX data.

In step S102, once the FAX data is stored into the confidential box A1, the CPU 21 executes a job flow for the confidential box A1, and transfers the FAX data stored in the confidential box A1 to the internal server 110 through the LAN 1.

In step S104, the CPU 21 acquires the condition setting 40A from the information storing part 23B.

The condition setting 40A will be described. The condition setting 40A is information in which specification of a condition for transferring FAX data to an external network is set. As a condition, at least one of a condition of a period and a condition of contents is set for the confidential box A1. As the condition of a period, the date, time, day of the week, or the like may be set. For example, in the case where Wednesdays are days to telework, the condition is that it is Wednesday. The condition of a period may be a combination of date, time, and day of the week. Furthermore, a condition of contents corresponding to the contents of received FAX data may be set. As the condition of contents, for example, the telephone number of a transmission source and the result of analysis of a document may be set. In the case of the result of analysis of a document, the type of a document such as a purchase order or an ordering document, a specific company name, or a name may be set. The condition of a period and the condition of contents may be combined together. A condition set in the condition setting 40A is an example of a specified condition in the present disclosure.

In step S106, the CPU 21 determines whether or not the condition in the condition setting 40A is satisfied. In the case where the condition is satisfied, the process proceeds to step S108. In the case where the condition is not satisfied, the process ends.

In step S108, the CPU 21 copies the FAX data in the confidential box A1 into the confidential box A2. The processing of step S108 is performed by setting in advance, as a setting of a job for the confidential box A1, a job for copying FAX data when the condition in the condition setting 40A is satisfied and executing the job. As described above, by performing copying of FAX data to another confidential box as a job, a log is stored so that tracking of which FAX data has been transferred may be done.

In step S110, once the FAX data is stored into the confidential box A2, the CPU 21 executes a job flow for the confidential box A2, and transfers the FAX data, which has been copied into the confidential box A2, to the external server 120 through the LAN 2.

As described above, according to the first exemplary embodiment, without the configuration of a network associated with a confidential box being changed, FAX data may be transferred to another network.

Second Exemplary Embodiment

According to a second exemplary embodiment, when FAX data is stored into the confidential box A1, an approval request email is transmitted to an administrator. Then, when approval is received, the FAX data is copied and transferred. By permitting transfer to an external network in the case where approval is obtained, security may be ensured. The components of an information processing system according to the second exemplary embodiment are similar to those described above with reference to FIG. 1. Thus, redundant explanation will be omitted. The same applies to other exemplary embodiments described below. An approval request email is an example of a notification for requesting approval in the present disclosure.

Figure 5:
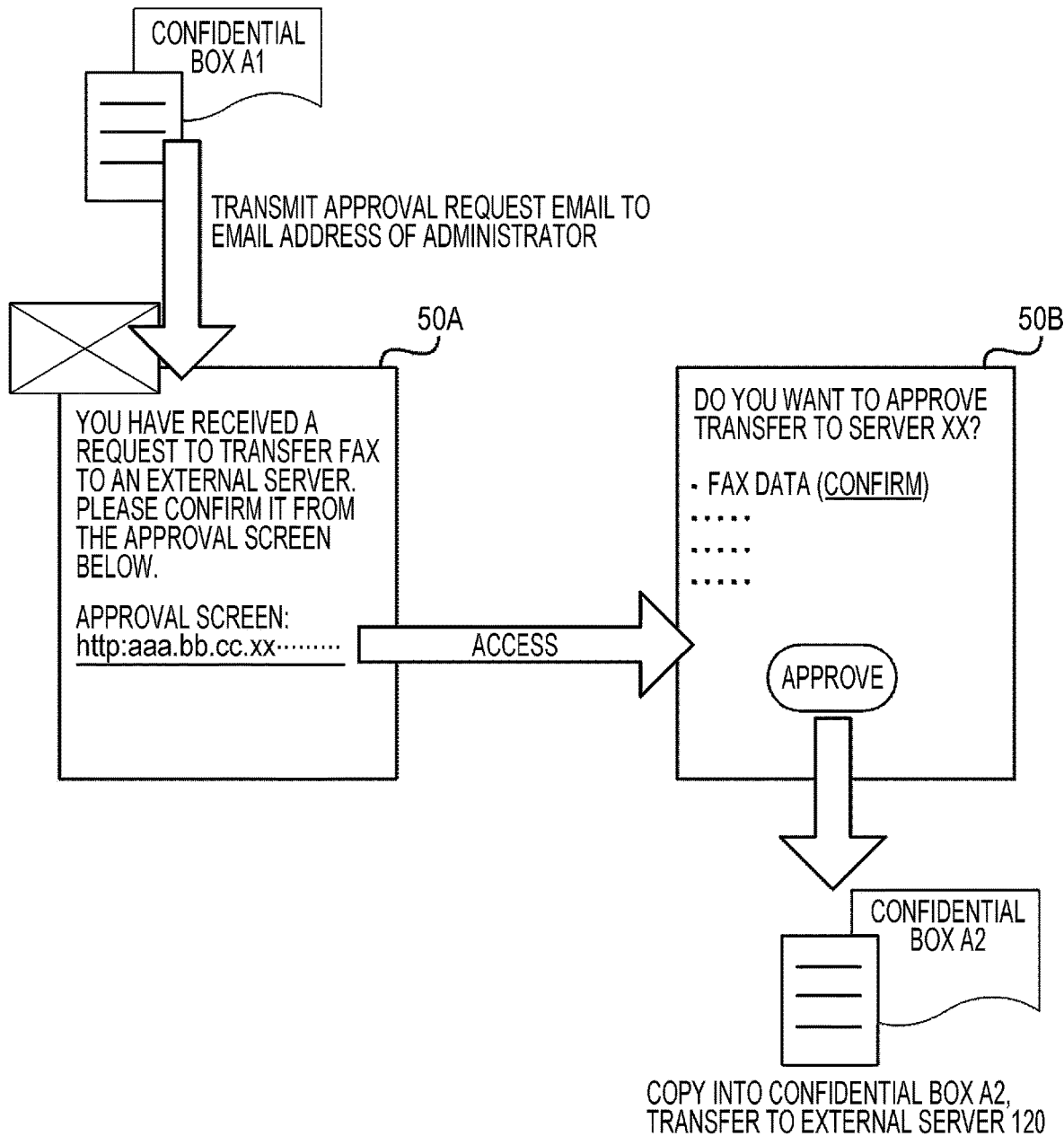
FIG. 5 is a diagram schematically illustrating the procedure of approval using an approval request email in a second exemplary embodiment.

According to the second exemplary embodiment, in the condition setting 40A, a condition that an approval request email is transmitted to the email address of an administrator and approval is obtained is set. In the case where approval is obtained, FAX data is copied into the confidential box A2. In the case where approval is not obtained, copying of FAX data is not performed. Furthermore, in the condition setting 40A, a condition of a period, a condition of contents, and a condition of approval may be combined together. FIG. 5 is a diagram schematically illustrating the procedure of approval using an approval request email in the second exemplary embodiment. An approval request email 50A contains, for example, explanatory text prompting approval for transfer to the external server 120 on an external network and a link to an approval screen 50B. The approval screen 50B may be provided as, for example, a web page that is able to be accessed only from an internal network. The explanatory text prompting approval in an approval request email is a wording such as "You have received a request to transfer FAX to an external server. Please confirm it from the approval screen below.". On the approval screen 50B, a link for confirming FAX data and an approval button are displayed. When the administrator confirms contents of approval and presses the approval button on the approval screen 50B, approval is given. An approval operation is not necessarily performed on the approval screen 50B. Approval may be given by simply clicking a uniform resource locator (URL) for approval.

Approval using an approval request email is not limited to the example mentioned above. For example, approval or disapproval may be indicated in the body of a reply email to an approval request email. For example, an approval request email may be a notification such as "You have received a request for approval at XXXX (identification ID of the information processing apparatus 100)", and an operation for approval may be performed using the UI section 11 of the information processing apparatus 100. In this case, contents similar to those of the approval screen 50B may be displayed on the display unit 14 of the information processing apparatus 100, and approval may be given when the approval button is pressed.

Figure 6:
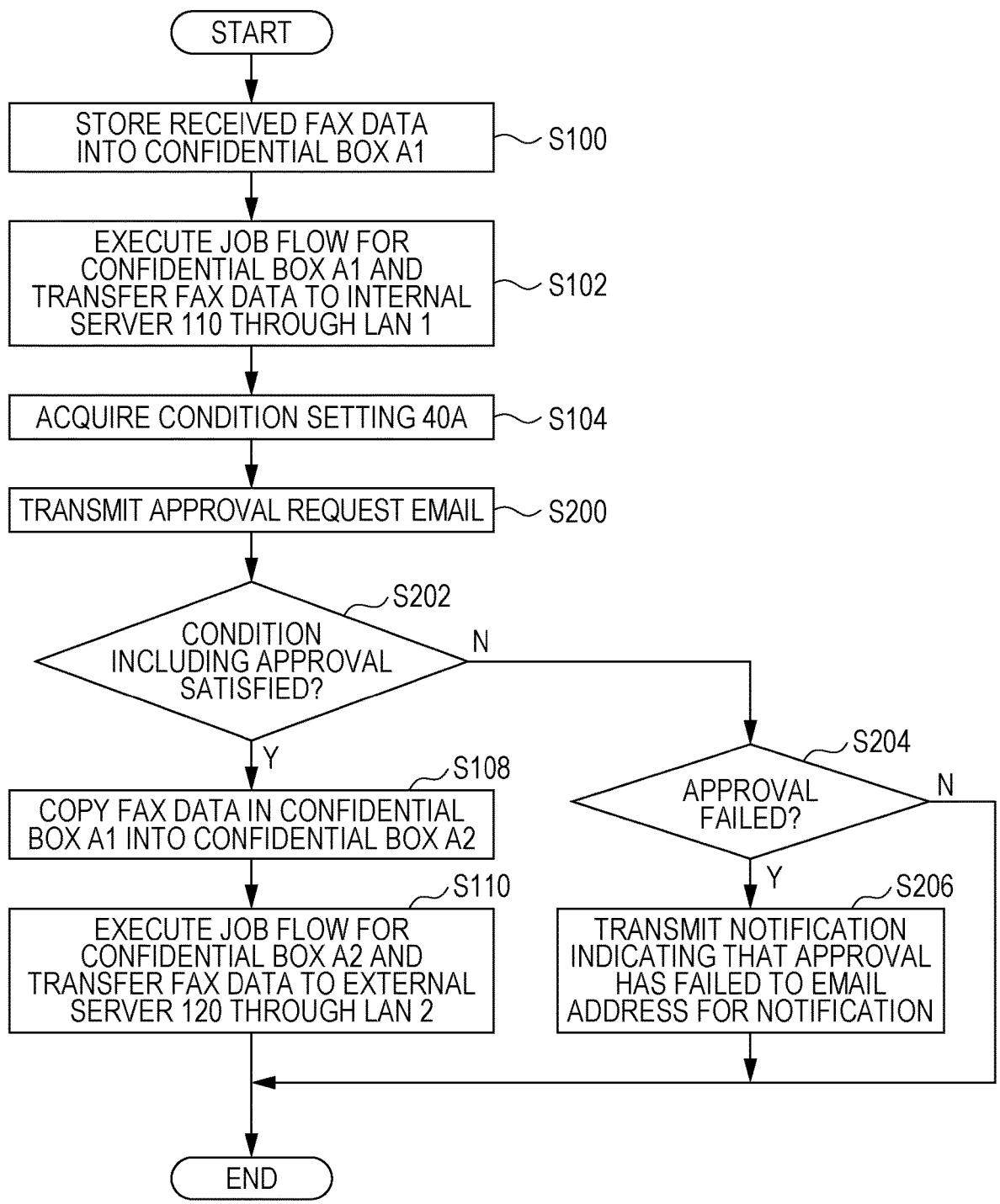
FIG. 6 is a flowchart illustrating a data transfer process performed by an information processing apparatus according to the second exemplary embodiment.

FIG. 6 is a flowchart illustrating a data transfer process performed by the information processing apparatus 100 according to the second exemplary embodiment. In the second exemplary embodiment, processing of step S200 is performed after step S104.

In step S200, the CPU 21 transmits an approval request email to an administrator. In step S202, the CPU 21 determines whether or not a condition including approval using the approval request email is satisfied. In the case where the condition is satisfied, the process proceeds to step S108. In the case where the condition is not satisfied, the process proceeds to step S204. In step S204, the CPU 21 determines whether or not approval has failed. In the case where it is determined that approval has failed, the process proceeds to step S206. In the case where it is determined that approval has not failed, the process ends. In step S206, the CPU 21 transmits a notification indicating that approval has failed to an email address for notification. For example, an email address for administration of a department to which FAX data is to be transmitted, an email address of a system administrator, or the like may be set appropriately as the email address for notification.

Third Exemplary Embodiment

Figure 7:
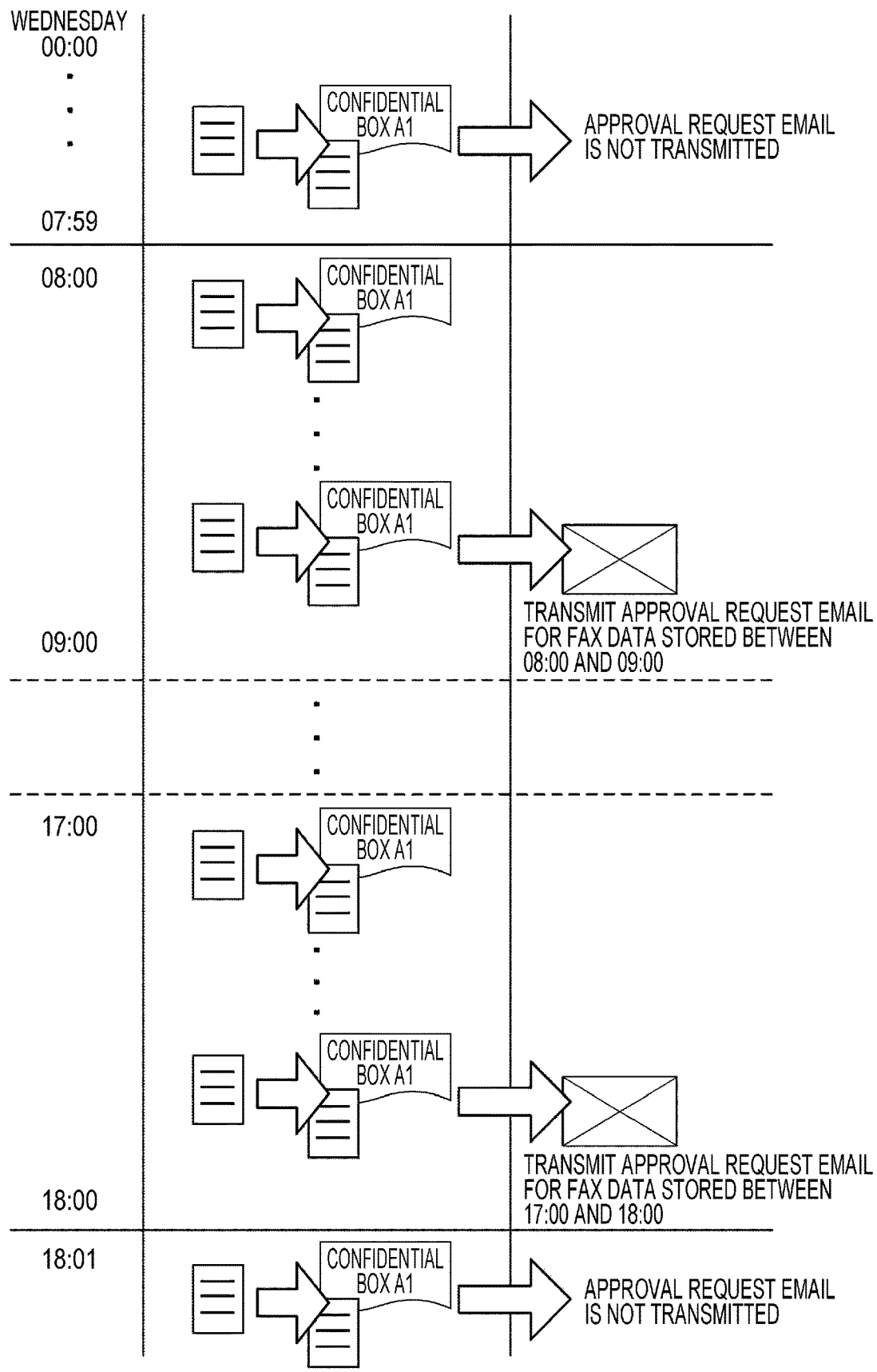
FIG. 7 is a diagram schematically illustrating the case where an approval request email is transmitted for FAX data within a specified period in a third exemplary embodiment.

In a third exemplary embodiment, compared to approval using an approval request email described above in the second exemplary embodiment, an approval request email for approving all the plurality of pieces of FAX data received during a specified period together is used. FIG. 7 is a diagram schematically illustrating the case where an approval request email is transmitted for FAX data during a specified period in the third exemplary embodiment. For example, each hour period between 8:00 to 18:00 on Wednesday is set as a specified period. In this case, if one or more pieces of FAX data are stored every hour, an approval request email is transmitted for the FAX data stored in the hour. For the first one hour, an approval request email is transmitted for FAX data stored during the period from 8:00 to 9:00. In this case, no approval request email is transmitted for FAX data stored before 08:00 and after 18:00. As described above, an approval request email is transmitted for FAX data stored into the confidential box A1 during a specified period of time, and no approval request email is transmitted for FAX data stored into the confidential box A1 outside the specified period of time. Accordingly, approval for all the FAX data within the specified period may be obtained together, and efficient approval may be achieved.

Fourth Exemplary Embodiment

Figure 8:
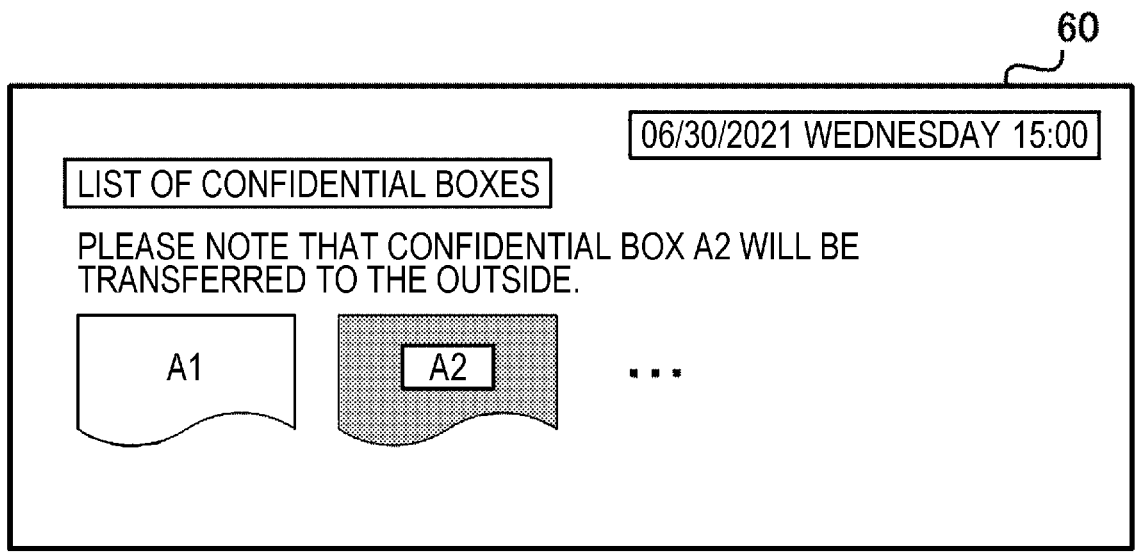
FIG. 8 is a diagram illustrating an example of the case where the display mode of a confidential box is changed in a fourth exemplary embodiment.

In a fourth exemplary embodiment, in the case where a condition of a period is set in the condition setting 40A or in the case where a specified period for approval is set as in the third exemplary embodiment, the display mode of the confidential box A2 displayed on the display unit 14 is changed. FIG. 8 is a diagram illustrating an example of the case where the display mode of a confidential box is changed in the fourth exemplary embodiment. As illustrated in FIG. 8, by changing the coloration of an icon of the confidential box A2 displayed on a list screen 60 for confidential boxes, it is easy to understand that data stored in the confidential box A2 will be transferred to an external network. Furthermore, as information indicating that transfer will be performed, explanatory text such as "Please note that confidential box A2 will be transferred to the outside." May be displayed along with an icon, as illustrated in FIG. 8. Furthermore, alert sound may be produced when a tap operation is performed on the confidential box A2.

The present disclosure is not limited to the exemplary embodiments described above. Various modifications and applications may be made to the present disclosure without departing from the scope of the present disclosure.

For example, in each of the foregoing exemplary embodiments, the case where FAX data is copied from the confidential box A1 into the confidential box A2 then transferred from the confidential box A2 to the external server 120 has been described above as an example. However, the present disclosure is not limited to this case. For example, in the case where a specified condition is satisfied, FAX data may be transferred directly from the confidential box A1 to the external server 120. In this case, the confidential box A2 is not used. FIG. 9 is a diagram schematically illustrating a procedure for the case where a process for transferring data directly from a confidential box is performed. In this case, the confidential box A1 is associated with the network I/F 31B to be used in normal time and with the network I/F 31C to be used only when a condition is satisfied.

An information process implemented when a CPU reads and executes software (program) in each of the foregoing exemplary embodiments may be executed by various processors other than the CPU. As a processor in this case, a programmable logic device (PLD) whose circuit configuration is changeable after manufacturing, such as a field programmable gate array (FPGA), a dedicated electric circuit having a circuit configuration that is dedicatedly designed for executing a specific process, such as an application specific integrated circuit (ASIC), or the like is illustrated as an example. Furthermore, the information process may be executed by one of the various processors or may be executed by a combination of two or more same or different types of processors (for example, a combination of a plurality of FPGAs, a combination of a CPU and an FPGA, or the like). Furthermore, more specifically, a hardware structure of various processors is an electric circuit including a plurality of circuit elements such as semiconductor elements.

In each of the foregoing exemplary embodiments, an aspect in which a program of an information process is stored (installed) in advance in a read only memory (ROM) or a storage has been described. However, the program of the information process is not necessarily stored in advance in the ROM or the storage. The program may be recorded in a non-transitory recording medium such as a compact disk-read only memory (CD-ROM), a digital versatile disk-read only memory (DVD-ROM), or a universal serial bus (USB) memory and provided. Furthermore, a program may be downloaded from an external device through a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in response to data being stored in a first storage area set in advance and associated with a first network interface, and in response to a specified condition being satisfied, transmit, using a predetermined transmission mode, the data from the first storage area to a second storage area set in advance and associated with a second network interface;
in response to the data is stored in the first storage area, and in response to the specified condition being satisfied by executing a job associated with the first storage area, transmit the data from the first storage area to the second storage area; and
in response to the data being copied from the first storage area to the second storage area by executing a job associated with the second storage area, transmit, using the predetermined transmission mode, the data from the second storage area to an output destination configured to communicate using the second network interface, the output destination being different from an output destination configured to communicate using the first network interface.

2. The information processing apparatus according to claim 1, wherein the specified condition includes at least one of: a condition of a period and a condition of contents of the data.

3. The information processing apparatus according to claim 1, wherein the processor is configured to, in response to the data being stored in the first storage area, transmit a notification for requesting approval, and
wherein the specified condition includes a condition regarding whether or not approval using the notification for requesting approval has been obtained.

4. The information processing apparatus according to claim 3, wherein the processor is configured to:
in response to one or more pieces of data being stored in the first storage area during a specified period, transmit the notification for requesting approval for the one or more pieces of data stored during the specified period; and
in response to the approval being obtained, provide approval for the one or more pieces of data stored during the specified period.

5. The information processing apparatus according to claim 2, wherein the processor is configured to, in response to the data being stored in the first storage area, transmit a notification for requesting approval, and
wherein the specified condition includes a condition regarding whether or not approval using the notification for requesting approval has been obtained.

6. The information processing apparatus according to claim 5, wherein the notification for requesting approval is configured to enable an approval operation to be performed using an interface.

7. The information processing apparatus according to claim 1, wherein the specified condition comprises a security condition that must be satisfied before the processor will allow transmission of the data to an external network associated with the second network interface.

8. An information processing apparatus comprising:
a processor configured to:
in response to data being stored in a first storage area set in advance and associated with a first network interface, and in response to a specified condition being satisfied, transmit, using a predetermined transmission mode, the data from the first storage area to a second storage area set in advance and associated with a second network interface,
wherein the processor is configured to, in response to the data being stored in the first storage area, transmit a notification for requesting approval,
wherein the specified condition includes a condition regarding whether or not approval using the notification for requesting approval has been obtained, and
wherein the processor is configured to:
in response to one or more pieces of data being stored in the first storage area during a specified period, transmit the notification for requesting approval for the one or more pieces of data stored during the specified period; and
in response to the approval being obtained, provide approval for the one or more pieces of data stored during the specified period.

9. An information processing apparatus comprising:
a processor configured to:
in response to data being stored in a first storage area set in advance and associated with a first network interface, and in response to a specified condition being satisfied, transmit, using a predetermined transmission mode, the data from the first storage area to a second storage area set in advance and associated with a second network interface,
wherein the processor is configured to, in response to the data is stored in the first storage area, and in response to the specified condition being satisfied by executing a job associated with the first storage area, transmit the data from the first storage area to the second storage area,
wherein the processor is configured to, in response to the data being stored in the first storage area, transmit a notification for requesting approval,
wherein the specified condition includes a condition regarding whether or not approval using the notification for requesting approval has been obtained, and
wherein the processor is configured to:
in response to one or more pieces of data being stored in the first storage area during a specified period, transmit the notification for requesting approval for the one or more pieces of data stored during the specified period; and
in response to the approval being obtained, provide approval for the one or more pieces of data stored during the specified period.

10. An information processing apparatus comprising:
a processor configured to:
in response to data being stored in a first storage area set in advance and associated with a first network interface, and in response to a specified condition being satisfied, transmit, using a predetermined transmission mode, the data from the first storage area to a second storage area set in advance and associated with a second network interface; and
in response to the data is stored in the first storage area, and in response to the specified condition being satisfied by executing a job associated with the first storage area, transmit the data from the first storage area to the second storage area,
wherein the specified condition includes at least one of: a condition of a period and a condition of contents of the data,
wherein the processor is configured to, in response to the data being stored in the first storage area, transmit a notification for requesting approval,
wherein the specified condition includes a condition regarding whether or not approval using the notification for requesting approval has been obtained, and
wherein the processor is configured to:
in response to one or more pieces of data being stored in the first storage area during a specified period, transmit the notification for requesting approval for the one or more pieces of data stored during the specified period; and
in response to the approval being obtained, provide approval for the one or more pieces of data stored during the specified period.

11. An information processing apparatus comprising:
a processor configured to:
in response to data being stored in a first storage area set in advance and associated with a first network interface, and in response to a specified condition being satisfied, transmit, using a predetermined transmission mode, the data from the first storage area to a second storage area set in advance and associated with a second network interface; and
in response to the specified condition including a condition of a period, change a display mode of the second storage area according to the period.

12. An information processing method comprising:
in response to data being stored in a first storage area set in advance and being associated with a first network interface, and in response to a specified condition being satisfied, transmitting, using a predetermined transmission mode, the data from the first storage area to a second storage area set in advance and associated with a second network interface;
in response to the data is stored in the first storage area, and in response to the specified condition being satisfied by executing a job associated with the first storage area, transmitting the data from the first storage area to the second storage area; and
in response to the data being copied from the first storage area to the second storage area by executing a job associated with the second storage area, transmitting, using the predetermined transmission mode, the data from the second storage area to an output destination configured to communicate using the second network interface, the output destination being different from an output destination configured to communicate using the first network interface.

13. A non-transitory computer readable medium storing a program, which if executed, causes a computer to execute an information process comprising:
in response to data being stored in a first storage area set in advance and being associated with a first network interface, and in response to a specified condition being satisfied, transmitting, using a predetermined transmission mode, the data from the first storage area to a second storage area set in advance and associated with a second network interface;
in response to the data is stored in the first storage area, and in response to the specified condition being satisfied by executing a job associated with the first storage area, transmitting the data from the first storage area to the second storage area; and in response to the data being copied from the first storage area to the second storage area by executing a job associated with the second storage area, transmitting, using the predetermined transmission mode, the data from the second storage area to an output destination configured to communicate using the second network interface, the output destination being different from an output destination configured to communicate using the first network interface.

* * * * *